Figures 9, 10:
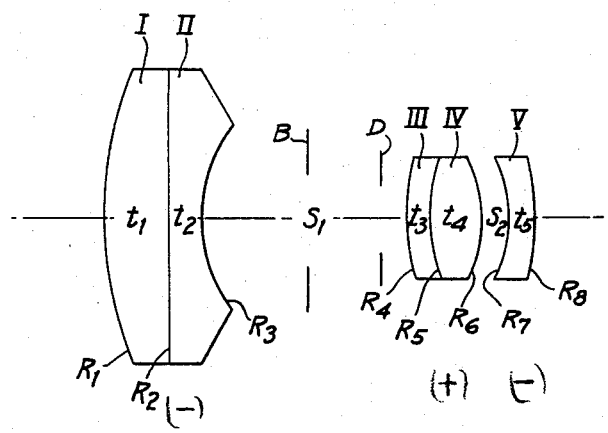

April 10, 1951     K. TOLLE     2,548,569
REVERSED TELEPHOTO OBJECTIVE HAVING A HIGH-INDEX
POSITIVE FRONT LENS ELEMENT Filed Nov. 4, 1949     3 Sheets-Sheet 1

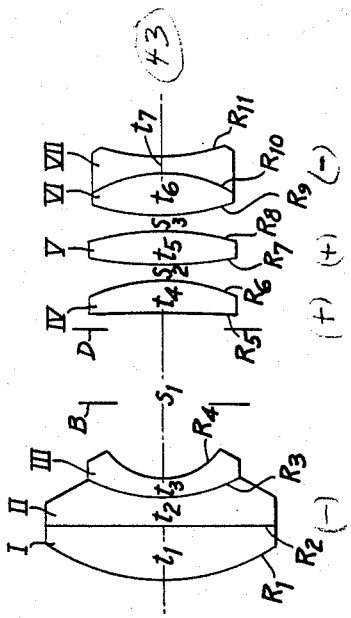

FIG. 3.

FIG. 4.

| EF = 100 mm. | | | | f/2 | |
|---|---|---|---|---|---|
| LENS | $N_D$ | V | RADII | | THICKNESSES |
| I | 1.880 | 41.1 | $R_1 = +113.6$ mm. | | $t_1 = 31.5$ mm. |
| II | 1.575 | 41.4 | $R_2 = \infty$ | | $t_2 = 13.9$ |
| III | 1.673 | 32.2 | $R_3 = +88.66$ | | $t_3 = 9.5$ |
|  |  |  | $R_4 = +35.74$ | | $S_1 = 97.2$ |
| IV | 1.620 | 60.3 | $R_5 = -560.5$ | | $t_4 = 14.6$ |
|  |  |  | $R_6 = -92.31$ | | $S_2 = 5.7$ |
| V | 1.620 | 60.3 | $R_7 = +348.4$ | | $t_5 = 18.6$ |
|  |  |  | $R_8 = -114.4$ | | $S_3 = 6.6$ |
| VI | 1.500 | 61.6 | $R_9 = +82.60$ | | $t_6 = 20.5$ |
| VII | 1.673 | 32.2 | $R_{10} = -66.23$ | | $t_7 = 5.7$ |
|  |  |  | $R_{11} = +94.91$ | | BF = 90.0 |

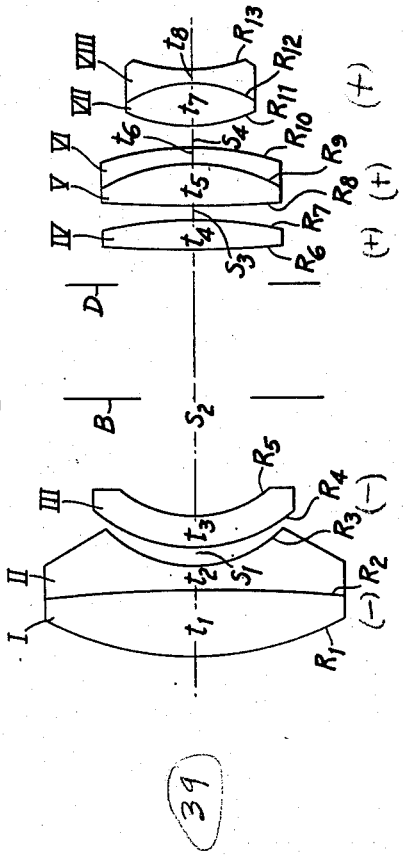

FIG. 1.

FIG. 2.

| EF = 100 mm. | | | | f/1.9 | |
|---|---|---|---|---|---|
| LENS | $N_D$ | V | RADII | | THICKNESSES |
| I | 1.755 | 47.2 | $R_1 = +196.1$ mm. | | $t_1 = 37.6$ mm. |
| II | 1.501 | 56.5 | $R_2 = -496.0$ | | $t_2 = 13.7$ |
|  |  |  | $R_3 = +76.20$ | | $S_1 = 6.1$ |
| III | 1.617 | 38.5 | $R_4 = +93.95$ | | $t_3 = 14.4$ |
|  |  |  | $R_5 = +57.38$ | | $S_2 = 170.9$ |
| IV | 1.734 | 51.1 | $R_6 = +410.2$ | | $t_4 = 20.5$ |
|  |  |  | $R_7 = -243.4$ | | $S_3 = 6.8$ |
| V | 1.517 | 64.5 | $R_8 = +213.9$ | | $t_5 = 27.3$ |
| VI | 1.689 | 30.9 | $R_9 = -82.91$ | | $t_6 = 9.6$ |
|  |  |  | $R_{10} = -128.1$ | | $S_4 = 15.6$ |
| VII | 1.501 | 56.5 | $R_{11} = +128.1$ | | $t_7 = 29.3$ |
| VIII | 1.649 | 33.8 | $R_{12} = -81.25$ | | $t_8 = 9.8$ |
|  |  |  | $R_{13} = +282.5$ | | BF = 109.0 |

KARL TOLLE
INVENTOR

BY Daniel I. Mayne
Harold F. Bennett
ATTORNEY & AGENT

April 10, 1951  K. TOLLE  2,548,569
REVERSED TELEPHOTO OBJECTIVE HAVING A HIGH-INDEX
POSITIVE FRONT LENS ELEMENT
Filed Nov. 4, 1949  3 Sheets-Sheet 2

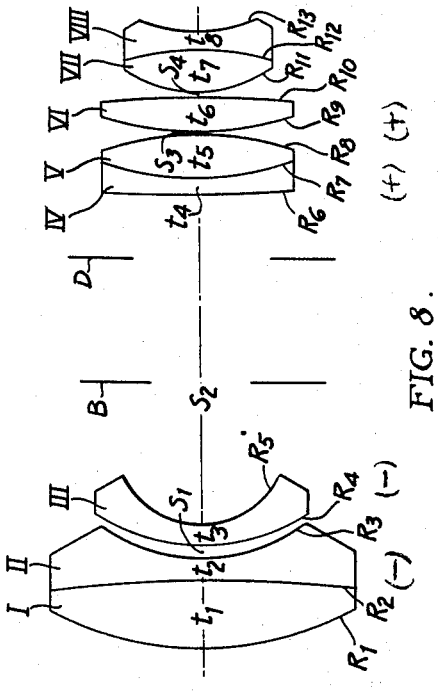

FIG. 7.

FIG. 8.

| EF = 100 mm. | | | f/1.7 | |
|---|---|---|---|---|
| LENS | $N_D$ | V | RADII | THICKNESSES |
| I | 1.804 | 41.8 | $R_1$ = +253.0 mm. | $t_1$ = 52.4 mm. |
| II | 1.570 | 48.1 | $R_2$ = −680.7 | $t_2$ = 15.1 |
| | | | $R_3$ = +131.7 | $S_1$ = 10.0 |
| III | 1.605 | 43.6 | $R_4$ = +155.4 | $t_3$ = 14.7 |
| | | | $R_5$ = +70.14 | $S_2$ = 256.2 |
| IV | 1.649 | 33.8 | $R_6$ = +601.2 | $t_4$ = 10.0 |
| V | 1.572 | 57.4 | $R_7$ = +187.6 | $t_5$ = 31.4 |
| | | | $R_8$ = −275.9 | $S_3$ = 0.4 |
| VI | 1.697 | 56.2 | $R_9$ = +213.8 | $t_6$ = 28.0 |
| | | | $R_{10}$ = −355.0 | $S_4$ = 0.4 |
| VII | 1.529 | 51.6 | $R_{11}$ = +98.36 | $t_7$ = 35.0 |
| VIII | 1.689 | 30.9 | $R_{12}$ = −160.2 | $t_8$ = 8.0 |
| | | | $R_{13}$ = +87.19 | BF = 128.2 |

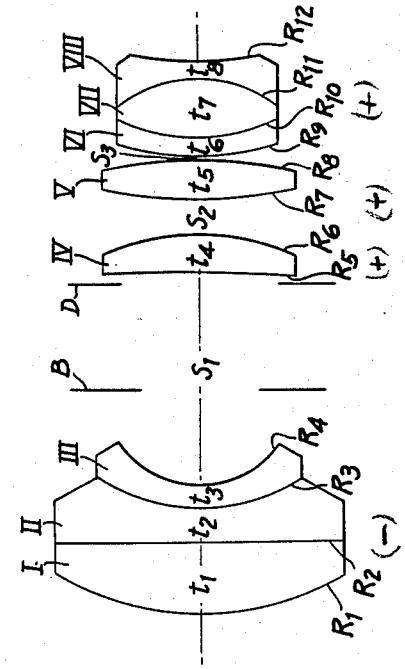

FIG. 5.

FIG. 6.

| EF = 100 mm | | | | f/1.9 |
|---|---|---|---|---|
| LENS | $N_D$ | V | RADII | THICKNESSES |
| I | 1.880 | 41.1 | $R_1$ = +119.3 mm. | $t_1$ = 33.0 mm. |
| II | 1.575 | 41.4 | $R_2$ = ∞ | $t_2$ = 14.6 |
| III | 1.673 | 32.2 | $R_3$ = +88.57 | $t_3$ = 9.9 |
| | | | $R_4$ = +37.48 | $S_1$ = 93.0 |
| IV | 1.589 | 60.4 | $R_5$ = −898.3 | $t_4$ = 16.3 |
| | | | $R_6$ = −95.66 | $S_2$ = 19.7 |
| V | 1.589 | 60.4 | $R_7$ = +306.8 | $t_5$ = 16.3 |
| | | | $R_8$ = −116.0 | $S_3$ = 0.3 |
| VI | 1.649 | 33.8 | $R_9$ = +126.5 | $t_6$ = 5.7 |
| VII | 1.500 | 61.6 | $R_{10}$ = +79.98 | $t_7$ = 27.1 |
| VIII | 1.649 | 33.8 | $R_{11}$ = −57.53 | $t_8$ = 5.7 |
| | | | $R_{12}$ = +234.1 | BF = 85.4 |

KARL TOLLE
INVENTOR
BY Daniel J. Mayne
Harold F. Bennett
ATTORNEY & AGENT

| EF = 100 mm. | | | | f/5.6 |
|---|---|---|---|---|
| LENS | $N_D$ | V | RADII | THICKNESSES |
| I | 1.880 | 41.1 | $R_1$ = + 105.3 mm | $t_1$ = 17.6 mm |
| II | 1.529 | 51.6 | $R_2$ = ∞ | $t_2$ = 6.4 |
| | | | $R_3$ = + 36.7 | $S_1$ = 103.0 |
| III | 1.720 | 29.3 | $R_4$ = +95.41 | $t_3$ = 5.3 |
| IV | 1.517 | 64.5 | $R_5$ = +64.63 | $t_4$ = 13.2 |
| | | | $R_6$ = −44.07 | $S_2$ = 8.0 |
| V | 1.720 | 29.3 | $R_7$ = −34.53 | $t_5$ = 5.3 |
| | | | $R_8$ = − 49.13 | BF = 121.2 |

KARL TOLLE
INVENTOR
BY Daniel J. Mayne
Harold F. Bennett
ATTORNEY & AGENT

Patented Apr. 10, 1951

2,548,569

UNITED STATES PATENT OFFICE 2,548,569

REVERSED TELEPHOTO OBJECTIVE HAVING A HIGH-INDEX POSITIVE FRONT LENS ELEMENT

Karl Tolle, Rochester, N. Y., assignor to Eastman Kodak Company, Rochester, N. Y., a corporation of New Jersey Application November 4, 1949, Serial No. 125,414

11 Claims. (Cl. 88—57)

This invention relates to photographic objectives of the reversed telephoto or wide-angle type comprising a front negative member and a rear positive member separated by a distance of the order of the focal length of the objective.

An object of the invention is to provide an objective of this type which is highly corrected for distortion, astigmatism, and curvature of field.

A further object of the invention is to provide an objective which is also highly corrected for spherical aberration and coma at apertures up to f/2 or larger.

A further object of the invention is to achieve this optical quality in a comparatively compact and simple objective.

The reversed telephoto or Brücke type of construction is useful in several types of optical systems when a long back focal length is needed, for example in a single-objective reflex camera, in color separation systems, or in certain motion picture projectors with continuously moving film. However, the unsymmetrical arrangement of the system tends to cause distortion of the barrel type in taking and of the pin-cushion type in projecting.

The basic principles of reversed telephoto lenses are well known. The positive member if used alone forms a real image of a distant object. This image, however, is usually rather close to the positive member or may actually be within it. When a negative member is placed in front of the positive member at such a distance that the optical separation, i. e. the distance from the rear principal point of the negative member to the front principal point of the positive member, is equal to the focal length of the positive member, it has no effect on the equivalent focal length but increases the back focal distance by an amount depending upon the power of the negative member. When the two members are separated less than this distance, the equivalent focal length is increased, and when separated more it is decreased. In any case, however, the back focal distance is longer than that of the positive member alone. Stated in another way, the equivalent focal length of the positive member is greater than that of the whole objective if the separation is greater than this distance, but it is smaller if the separation is smaller. Thus when the separation and the back focal distance are specified, relative to the equivalent focal length of the objective, the focal lengths of the two members are determined within narrow limits.

As a corollary, if a certain back focal length is specified, as required by the conditions of use, a greater separation results in weaker powers and hence weaker curves and tends to give better optical quality at any specified aperture, but on the other hand it requires a greater diameter of the negative member and results in a longer and more bulky objective. As stated above, one of the objects of the present invention is to achieve higher optical quality with the same separation or equal quality with smaller separation than heretofore, for any specified back focal length and aperture required by the conditions of use.

According to the present invention, a reversed telephoto objective is made up in which the negative member comprises a positive front element which has a refractive index greater than 1.69 and less than 2.0 (the approximate upper limit of suitable known glasses), and a negative second element which has a refractive index lower than that of the front element by between 0.18 and 0.5. These two elements are preferably cemented together. However, it is well known that a pair of surfaces separated by a small airspace is substantially equivalent to a cemented surface. For the purposes of the invention the curvatures of these two surfaces should differ by less than about $\pm 0.5/F$, and whether cemented or not the average of their curvatures is between $-0.4/F$ and $+0.2/F$ where $F$ is the focal length of the objective as a whole.

I have discovered that this feature of a high index difference combined with weak curvatures of the first pair of internal contact surfaces corrects the distortion to a high degree and with less zonal distortion than has heretofore been present in this type of lens.

This feature is of great advantage when embodied in various known forms of negative members. In the simplest form the two elements constitute the whole member. In other forms the member is made up of a cemented doublet and a simple element, or of a cemented triplet, or of two cemented doublets. In any case, the power of the said first two elements combined should be equal to or numerically less than the power of the whole negative member, and if positive should preferably be less than six tenths that of the whole member.

The negative member is meniscus in outward form and convex to the front. I have found that for the best correction of astigmatism the front surface should have a radius of curvature between $0.9S$ and $(0.4F+S)$ and the rear surface of this member a radius between $(0.1F+0.2S)$ and $(0.18F+0.28S)$, where $F$ is the focal length of the objective and $S$ is the distance between the two members. These curvatures are influenced somewhat by the details of structure of the positive member, but are preferably within these limits when the positive member is of the preferred type described below.

The above features of the invention are useful in systems with a wide variety of structures of the positive member, but I have found a comparatively simple structure to be satisfactory, whereby the positive member consists of one or more positive components followed by a rear component which may be positive, negative, or afocal but advantageously has a power between $-1/F$ and $+1/2F$.

According to another feature of the invention the rear component of the positive member is meniscus in shape and has a power between $-0.8/F$ and $+0.2/F$. The shape of this rear component should differ by a considerable but rather definite amount from the shape giving minimum deviation of the principal rays in order to have the best effect on the astigmatism and distortion. To give it this favorable shape, the radius of curvature of the convex surface should be between $0.7F$ and $2F$ when convex to the front and between $0.4F$ and $0.7F$ when convex to the rear. I have discovered that this feature aids in correcting the distortion and reduces the overcorrected zone of tangential curvature which tends to result when the entire burden of distortion-correction is put upon the internal pair of surfaces of the negative member. This holds true, and thus this feature is useful, whether or not the negative member is made up exactly as above described. The said internal pair of surfaces of the negative member should, however, have a mean curvature between $-1/F$ and $+0.2/F$ and the index difference should be greater than 0.08 in the same sense as above indicated if this feature of the positive member is to give superior results.

Preferably the component immediately in front of the rear component is biconvex. The optimum number of components in the positive member is determined by the requirements of aperture and image sharpness under any particular conditions of use. It is well known in the designing of optical systems that replacing a positive component by two or more weaker positive components tends to reduce the zonal spherical aberration, and thus permits larger useful apertures. I have found that a positive member made up of one positive component and the above described weak rear component is sufficient to give a very high quality image at apertures up to about f/4, and that replacing the positive component by two gives very satisfactory results up to about f/1.7.

The achromatizing of an objective according to the invention during the design thereof is done in the customary way and without any unusual difficulty. The two members are separately achromatized to correct axial color. Should there remain a residue of lateral color, then both members are to be over-corrected or both under-corrected while maintaining axial correction. One of these conditions will be found to change the lateral color in the right direction, whereupon it is easy to determine the right amount of over- or under-correction of each member to entirely correct the lateral color.

The manner of achromatizing each member is, of course, by choosing suitable V-values for the positive and negative elements therein. The elements which have the same sign as the whole member always have larger V-values on the average than the elements of the opposite sign. The negative member has already been described as including an element of each sign, permitting achromatization in this manner. In the case of the positive member at least one component is compound and has an internal pair of surfaces having negative power for correcting the spherical aberration. This pair of surfaces should differ in curvature by less than $\pm 0.5/F$, and usually are made of equal curvature and cemented together for manufacturing economy. Preferably, the average curvature of the pair of internal contact surfaces thus formed, whether cemented or not, is numerically between $1.3/F$ and $2/F$ when there is only one such pair of surfaces, and between $0.8/F$ and $1.5/F$ when there are two.

I have also discovered that the best correction of zonal spherical aberration is obtained when the index difference at at least one such internal pair of surfaces is between 0.12 and 0.30, and preferably greater than 0.16.

Although the color and spherical aberration can be corrected by compounding any component of the positive member in this manner, I have obtained the most favorable results in high aperture lenses by compounding the weak rear component, and when the highest degree of correction is required, another component also.

I have found it advantageous to make the positive member rather compact. The several elements obviously must exceed a certain minimum thickness, determined directly by their curvatures and diameters, if they are to be made at all, and must exceed this minimum by about a millimeter to be manufactured economically. I prefer to keep the thicknesses of the lens elements near this minimum and to make the total of the air spaces in the positive member between zero and $0.4F$. Usually tthis results in an over-all axial length of the positive member between $0.25F$ and $1.6F$. Likewise, the thickness of the negative member is advantageously near the minimum practical thickness. The axial thickness of this member can usually be made less than $$\left(\frac{F}{f-\text{number}}+0.2S\right)$$

By the use of the above-described features, I have succeeded in producing highly corrected objectives with back focal distances between $0.7F$ and $2.0F$ while spacing the two members apart a comparatively short distance (between $0.5F$ and $5.0F$) depending upon the back focal distance BF and aperture required by the conditions of use. The longer the back focal distance and the greater the aperture required, the greater the air space between the members must be to have good correction. I have found that, as a rough rule of thumb, the space S can be within 15% of the value $$S=\frac{5.1F}{(f-\text{number})^2}+3BF-3F$$

in objectives according to the invention in which the negative member consists of more than two elements and from 15% to 45% larger than this value when the negative member consists of two elements only. The f-number here is the maximum f-number or aperture ratio required by the conditions of use. This rule is of course not strictly binding. It was empirically derived from the several examples shown below, and is useful as a guide to anyone applying the invention to new conditions of use. If lower optical quality is acceptable, the space may be made shorter, resulting in greater compactness, whereas a longer space is generally needed when higher optical quality is required.

In the accompanying drawings:

Figs. 1, 3, 5, 7 and 9 show objectives according to the invention,

Figs. 2, 4, 6, 8, and 10 give the corresponding constructional data for each.

Fig. 1 shows an objective in which the front negative member consists of a front positive element I, a negative element II cemented thereto, and a second negative element III spaced a short distance therebehind. The rear positive member consists of a positive singlet IV, a biconvex doublet V, VI, and a weak compound meniscus doublet VII, VIII concave toward the rear.

The data given in Fig. 2 is repeated below, and data are also given for two slightly different embodiments of the objective shown in Fig. 1

[Example 1, Figs. 1 and 2, f/1.9, ±20°.]

| Lens | N | V | Radii | Thicknesses |
|---|---|---|---|---|
| I | 1.755 | 47.2 | $R_1 = +196.1$ mm. | $t_1 = 37.6$ mm. |
| II | 1.501 | 56.5 | $R_2 = -496.0$ | $t_2 = 13.7$ |
|  |  |  | $R_3 = +76.20$ | $s_1 = 6.1$ |
| III | 1.617 | 38.5 | $R_4 = +93.95$ | $t_3 = 14.4$ |
|  |  |  | $R_5 = +57.38$ | $s_2 = 170.9$ |
| IV | 1.734 | 51.1 | $R_6 = +410.2$ | $t_4 = 20.5$ |
|  |  |  | $R_7 = -243.4$ | $s_3 = 6.8$ |
| V | 1.517 | 64.5 | $R_8 = +2,139.$ | $t_5 = 27.3$ |
| VI | 1.689 | 30.9 | $R_9 = -82.91$ | $t_6 = 9.6$ |
|  |  |  | $R_{10} = -128.1$ | $s_4 = 15.6$ |
| VII | 1.501 | 56.5 | $R_{11} = +128.1$ | $t_7 = 29.3$ |
| VIII | 1.649 | 33.8 | $R_{12} = -81.25$ | $t_8 = 9.8$ |
|  |  |  | $R_{13} = +282.5$ | BF = 109.0 |

[Example 2, Fig. 1, f/1.7, ±23 1/2°.]

| Lens | N | V | Radii | Thicknesses |
|---|---|---|---|---|
| I | 1.734 | 51.1 | $R_1 = +200.2$ mm. | $t_1 = 45.3$ mm. |
| II | 1.501 | 56.5 | $R_2 = -687.7$ | $t_2 = 14.7$ |
|  |  |  | $R_3 = +81.67$ | $s_1 = 11.3$ |
| III | 1.617 | 36.6 | $R_4 = +99.87$ | $t_3 = 14.0$ |
|  |  |  | $R_5 = +60.43$ | $s_2 = 189.2$ |
| IV | 1.734 | 51.1 | $R_6 = +502.7$ | $t_4 = 19.3$ |
|  |  |  | $R_7 = -209.8$ | $s_3 = 6.7$ |
| V | 1.517 | 64.5 | $R_8 = +258.50$ | $t_5 = 29.3$ |
| VI | 1.720 | 29.3 | $R_9 = -114.8$ | $t_6 = 10.6$ |
|  |  |  | $R_{10} = -192.1$ | $s_4 = 14.3$ |
| VII | 1.511 | 63.5 | $R_{11} = +115.4$ | $t_7 = 26.8$ |
| VIII | 1.649 | 33.8 | $R_{12} = -95.50$ | $t_8 = 8.1$ |
|  |  |  | $R_{13} = +139.5$ | BF = 101.7 |

[Example 3, Fig. 1, f/1.9, 14°.]

| Lens | N | V | Radii | Thicknesses |
|---|---|---|---|---|
| I | 1.755 | 47.2 | $R_1 = +192.7$ mm. | $t_1 = 32.8$ mm. |
| II | 1.501 | 56.5 | $R_2 = -393.2$ | $t_2 = 13.4$ |
|  |  |  | $R_3 = +74.05$ | $s_1 = 6.9$ |
| III | 1.617 | 38.5 | $R_4 = +92.37$ | $t_3 = 14.1$ |
|  |  |  | $R_5 = +57.33$ | $s_2 = 167.5$ |
| IV | 1.755 | 47.2 | $R_6 = +414.8$ | $t_4 = 20.2$ |
|  |  |  | $R_7 = -248.6$ | $s_3 = 7.9$ |
| V | 1.517 | 64.5 | $R_8 = +1,526.$ | $t_5 = 26.9$ |
| VI | 1.689 | 30.9 | $R_9 = -83.72$ | $t_6 = 9.4$ |
|  |  |  | $R_{10} = -127.5$ | $s_4 = 15.4$ |
| VII | 1.500 | 61.6 | $R_{11} = +135.4$ | $t_7 = 28.9$ |
| VIII | 1.649 | 33.8 | $R_{12} = -78.06$ | $t_8 = 10.5$ |
|  |  |  | $R_{13} = +312.6$ | BF = 107.2 |

Example 3 is designed for use with an optical rectification device equivalent to a plane parallel plate of glass 26.4 mm. thick and having a refractive index of 1.523. As is well known, such a parallel plate tends to overcorrect spherical aberration and color, and so the objective is slightly undercorrected to counterbalance this effect.

Figs. 3 and 4 show an objective of slightly simpler construction in which the negative member differs from Fig. 1 in that both internal pairs of surfaces are cemented, and the positive member consists of two simple positive elements and a slightly negative cemented doublet. This data is as follows:

[Example 4, Figs. 3 and 4, f/2, ±20°.]

| Lens | N | V | Radii | Thicknesses |
|---|---|---|---|---|
| I | 1.880 | 41.1 | $R_1 = +113.6$ mm. | $t_1 = 31.5$ mm. |
| II | 1.575 | 41.4 | $R_2 = \infty$ | $t_2 = 13.9$ |
| III | 1.673 | 32.2 | $R_3 = +68.66$ | $t_3 = 9.5$ |
|  |  |  | $R_4 = +35.74$ | $s_1 = 97.2$ |
| IV | 1.620 | 60.3 | $R_5 = -560.5$ | $t_4 = 14.6$ |
|  |  |  | $R_6 = -92.31$ | $s_2 = 5.7$ |
| V | 1.620 | 60.3 | $R_7 = +348.4$ | $t_5 = 18.6$ |
|  |  |  | $R_8 = -114.4$ | $s_3 = 6.6$ |
| VI | 1.500 | 61.6 | $R_9 = +82.60$ | $t_6 = 20.5$ |
| VII | 1.673 | 32.2 | $R_{10} = -66.23$ | $t_7 = 5.7$ |
|  |  |  | $R_{11} = +94.91$ | BF = 90.0 |

Figs. 5 and 6 show an objective which is similar to the previous example except that the rearmost component is a cemented triplet. This results in a larger usable aperture and/or higher optical quality. This data is as follows:

[Example 5, Figs. 5 and 6, f/1.9, ±20°.]

| Lens | N | V | Radii | Thicknesses |
|---|---|---|---|---|
| I | 1.880 | 41.1 | $R_1 = +119.3$ mm. | $t_1 = 33.0$ mm. |
| II | 1.575 | 41.4 | $R_2 = \infty$ | $t_2 = 14.6$ |
| III | 1.673 | 32.2 | $R_3 = +88.57$ | $t_3 = 9.9$ |
|  |  |  | $R_4 = +37.48$ | $s_1 = 93.0$ |
| IV | 1.589 | 60.4 | $R_5 = -898.3$ | $t_4 = 16.3$ |
|  |  |  | $R_6 = -95.66$ | $s_2 = 19.7$ |
| V | 1.589 | 60.4 | $R_7 = +306.8$ | $t_5 = 16.3$ |
|  |  |  | $R_8 = -116.0$ | $s_3 = 0.3$ |
| VI | 1.649 | 33.8 | $R_9 = +126.5$ | $t_6 = 5.7$ |
| VII | 1.500 | 61.6 | $R_{10} = +79.98$ | $t_7 = 27.1$ |
| VIII | 1.649 | 33.8 | $R_{11} = -57.53$ | $t_8 = 5.7$ |
|  |  |  | $R_{12} = +234.1$ | BF = 85.4 |

Figs. 7 and 8 show an objective similar in general arrangement to Fig. 1 but with a longer back focal length and a correspondingly longer central space. Also the front component of the positive member is compound, rather than the second component. Since divergent pencils of light are incident upon this front component of the positive member, the internal pair of surfaces (a cemented surface as shown) is concave to the rear whereas the compound component in Fig. 1 receives convergent pencils and its internal pair of surfaces is concave to the front. Probably the objective shown in Fig. 7 could have designed with this cemented surface curved in the other direction, but it appears to give slightly better results as shown.

The data for this objective is as follows:

[Example 6, Figs. 7 and 8, f/1.7, 27 1/2°.]

| Lens | N | V | Radii | Thicknesses |
|---|---|---|---|---|
| I | 1.804 | 41.8 | $R_1 = +253.0$ mm. | $t_1 = 52.4$ mm. |
| II | 1.570 | 48.1 | $R_2 = -680.7$ | $t_2 = 15.1$ |
|  |  |  | $R_3 = +131.7$ | $s_1 = 10.0$ |
| III | 1.605 | 43.6 | $R_4 = +155.4$ | $t_3 = 14.7$ |
|  |  |  | $R_5 = +70.14$ | $s_2 = 256.2$ |
| IV | 1.649 | 33.8 | $R_6 = +601.2$ | $t_4 = 10.0$ |
| V | 1.572 | 57.4 | $R_7 = +187.6$ | $t_5 = 31.4$ |
|  |  |  | $R_8 = -275.9$ | $s_3 = 0.4$ |
| VI | 1.697 | 56.2 | $R_9 = +213.8$ | $t_6 = 28.0$ |
|  |  |  | $R_{10} = -355.0$ | $s_4 = 0.4$ |
| VII | 1.529 | 51.6 | $R_{11} = +98.36$ | $t_7 = 35.0$ |
| VIII | 1.689 | 30.9 | $R_{12} = -160.2$ | $t_8 = 8.0$ |
|  |  |  | $R_{13} = +87.19$ | BF = 128.2 |

Figs. 9 and 10 show a simpler objective according to the invention in which the negative member consists of a cemented doublet I, II, and the positive member consists of a biconvex cemented doublet III, IV, and a negative meniscus singlet V. This objective was designed for copying at a reduction of 35 to 1 and at an aperture of f/8. When a sample was made up, however, it was found to have satisfactory optical quality at apertures up to f/5.6 or somewhat larger.

The specifications for this objective are as follows:

[Example 7, Figs. 9 and 10, f/5.6, 20°.]

| Lens | N | V | Radii | Thicknesses |
|---|---|---|---|---|
| I | 1.880 | 41.1 | $R_1$= +105.3 mm. | $t_1$= 17.6 mm. |
| II | 1.529 | 51.6 | $R_2$= ∞ | $t_2$= 6.4 |
|  |  |  | $R_3$= +36.37 | $s_1$=103.0 |
| III | 1.720 | 29.3 | $R_4$= +95.41 | $t_3$= 5.3 |
| IV | 1.517 | 64.5 | $R_5$= +64.63 | $t_4$= 13.2 |
|  |  |  | $R_6$= −44.07 | $s_2$= 8.0 |
| V | 1.720 | 29.3 | $R_7$= −34.53 | $t_5$= 5.3 |
|  |  |  | $R_8$= −49.13 | BF=121.2 |

Figs. 1, 3, 5, 7, and 9 each show a diaphragm D and a baffle plate B. The baffle plate is used in known manner to cut down a slight haze that would otherwise appear around the extreme oblique images.

In each data table, the lens elements are numbered by Roman numerals in order from front to rear in the first column, the corresponding refractive index N for the D line of the spectrum and the Abbe dispersive index V are given for each element in the next two columns. In the last two columns are given the radii of curvature R of the optical surfaces, the thicknesses $t$ of the lens elements, and the spaces $s$ between components each numbered by subscripts in order from front to rear, and the back focal distance BF. These values correspond to an equivalent focal length of 100 mm. in accordance with the usual convention. The objectives were originally designed to be made up in focal lengths ranging from about 15 mm. to about 35 mm.

In all the examples the front element I is positive and has a refractive index between 1.69 and 2.00, and the second element II has an index lower than that of the front element by between 0.18 and 0.5 in accordance with the invention. These two elements are cemented together in each case for reasons of manufacturing economy and the curvature $1/R_2$ in each case is between $-1/(2.5F)$ and $+1/(5F)$, also in accordance with the invention. This range includes zero, which of course denotes a plane surface. The power of the front two elements combined is numerically smaller than that of the whole negative member in the first six examples. In Example 7 these two elements make up the whole negative member and so their power is of course equal to that of the whole. In Example 4 and 5 the power of these elements (computed as though followed by an airspace of zero thickness) is positive, but numerically less than 0.6 time that of the whole member. These powers and others pertinent to other features of the invention are set forth in the following table, in which P is the power of the whole objective, $P_A$ is the power of the two front elements, $P_N$ that of the whole negative member, $P_P$ that of the positive member, and $P_Z$ that of the rear component of the positive member, each computed with due regard to the lens thicknesses, and the ratio of $P_A$ to $P_N$ is given in the third column as a percentage.

|  | $P_A/P$ | $P_N/P$ | Per Cent | $P_P/P$ | $P_Z/P$ |
|---|---|---|---|---|---|
| Ex. 1 | −.145 | −.475 | +31 | +.853 | +.014 |
| Ex. 2 | −.134 | −.452 | +30 | +.856 | −.125 |
| Ex. 3 | −.148 | −.472 | +31 | +.879 | +.002 |
| Ex. 4 | +.255 | −.554 | −46 | +1.197 | −.276 |
| Ex. 5 | +.217 | −.526 | −41 | +1.169 | −.164 |
| Ex. 6 | −.029 | −.419 | +7 | +.752 | −.226 |
| Ex. 7 | −.454 | −.454 | +100 | +1.052 | −.525 |

The power $P_P$ of the positive member is within ±30% of the power of the whole objective and the power $P_N$ of the negative member is between −30% and −60% of the power of the whole objective in every case, as would be expected from the known general principles of this type of objective.

The power of the rear component of each positive member is given in the last column of the above table. This power is between −0.8P and +0.2P in every case, in accordance with this feature of the invention. The shape of this component is meniscus in every case. In Examples 1 to 6 it is convex to the front, the convex surface having a radius of curvature between 0.7F and 2F and in Example 7 it is convex to the rear, the rear surface having a radius of curvature between 0.4F and 0.7F in accordance with this preferred feature.

The component immediately in front of the meniscus component is biconvex in every case. In Example 7 it is the only positive component, while in Examples 1 to 6 there is another positive component in front of it. This positive part of the positive member can also be divided into three components if a still larger aperture is required, but I have found two positive components adequate for apertures up to f/1.7. Incidentally, it may be pointed out that the surfaces $R_6$ and $R_7$ of Figs. 9 and 10 (Ex. 7) are not an "internal pair of surfaces" of the kind above described as being equivalent to a cemented surface because they are spaced apart more than 0.05F both at the axis and at the edge and differ by 0.83/F (which is more than 0.5/F) in curvature.

The spacing S between the two members agrees very closely with the above-stated rule, namely that $$S=\frac{5.1F}{(f-\text{number})^2}+3BF-3F$$

when there are more than two elements in the negative member and is about 130% of this value when there are only two elements as in Example 7. The values computed according to this rule are given under $S_C$ in the table below, and the percentage deviation of the actual value S is given under $D_S$. Likewise, the preferred upper limit to the thickness of the negative member $$\left(\frac{F}{f-\text{number}}+0.2s\right)$$

is given under $T_C$, and the deviation of the actual value from the computed limit is given under $D_T$. The lower limit to the thickness of the negative member is set by the practical considerations of manufacturing economy, and is usually more than half of $T_C$.

| Example No. | $S_C$ | $D_S$ | $T_C$ | $D_T$ |
|---|---|---|---|---|
|  | Mm. | Per cent | Mm. | Per cent |
| 1 | 168.3 | +1.5 | 86.8 | −17 |
| 2 | 181.6 | +4.2 | 96.7 | −12 |
| 3 | 162.9 | +2.8 | 86.1 | −22 |
| 4 | 97.5 | +0.3 | 69.4 | −21 |
| 5 | 97.5 | −4.6 | 71.2 | −19 |
| 6 | 261.1 | −1.9 | 110.1 | −16 |
| 7 | 103.8 | −0.8 | 38.5 | −38 |

It will be noted that the difference $D_S$ is less than ±5% in each case. A deviation up to ±25% would still be a close agreement, although ±15% has been given as the preferred range.

The thickness T of the negative member is of course less than the preferred upper limit in each case. The formula as given neglects some significant factors such as the number of elements used, the angular field covered, and certain refractive indices, but it is sufficiently accurate as a rough rule.

The radii of curvature of the front and rear surfaces of the negative member are all within the limits set forth. These limits are $0.9S$ and $(0.4F+S)$ for the front surface and are $(0.1F+0.2S)$ and $(0.18F+0.28S)$ for the rear surface. Computed for the specific spacings of the above examples, the limits would be as follows:

| Example | Front Surface $R_1$ | | Rear Surface $R_k$ | |
| --- | --- | --- | --- | --- |
| 1 | 153.8 | 210.9 | 44.2 | 65.9 |
| 2 | 170.3 | 229.2 | 47.8 | 71.6 |
| 3 | 150.8 | 207.5 | 43.5 | 64.9 |
| 4 | 87.5 | 137.2 | 29.4 | 45.2 |
| 5 | 83.7 | 133.0 | 28.6 | 44.0 |
| 6 | 230.6 | 296.2 | 61.2 | 89.7 |
| 7 | 92.7 | 143.0 | 30.6 | 46.8 |

The actual values are given above in the data tables, and may easily be seen to be between the two limits in each case.

As previously mentioned, the preferred feature of structure of the positive member whereby the rear component has a power $1/F_L$ between $+0.2/F$ and $-0.8/F$ appears to influence the shape of the negative member somewhat, according to the power of this component. It is preferred that the radii of curvature $R_1$ and $R_k$ of the front and rear surfaces of the negative member be within $\pm 10\%$ of the values $$R_1 = 0.84S + 0.70\ F^2/F_L + 0.52F$$
and $$R_k = 0.22S + 0.22\ F^2/F_L + 0.20F$$

respectively when the rear component is concave toward the rear, and greater than these values by less than 20% when the rear component is concave toward the front. This preferred range of shapes has been found particularly favorable for correcting the curvature of field.

Thus it is apparent that each example embodies all the features of the invention as above set forth.

I claim:

1. A photographic objective comprising a front negative member and a rear positive member in optical alignment and spaced apart by a distance which is more than $0.5F$ and less than $5F$ where F is the focal length of the objective as a whole, the powers of the two members being such that the back focal length of the objective is between $0.7F$ and $2F$, in which the negative member is meniscus in outward form and convex to the front and comprises a front positive element and a negative element closely adjacent thereto, these two elements combined having a power equal to or numerically smaller than that of the whole negative member, and in which the positive member comprises a rear component and at least one positive component in front thereof, at least one component of the positive member being compound and including an internal pair of surfaces of negative power for correcting spherical aberration, and the total of the airspaces within the positive member being between zero and $0.4F$, and which objective is characterized by the refractive index of the front element being between 1.69 and 2.00 and higher than that of the second element by between 0.18 and 0.5, by the mean curvature of the pair of internal surfaces separating these two elements being between $-0.4/F$ and $+0.2/F$, and by the rearmost component being meniscus in shape and having a power between $-1/F$ and $+1/2F$, wherein a "pair of internal surfaces" is defined as two closely adjacent surfaces which differ in curvature by less than $\pm 0.5/F$.

2. An objective according to claim 1 in which the radius of curvature of the convex front surface of the negative member is between $0.9S$ and $(0.4F+S)$ and that of the concave rear surface of the negative member is between $(0.1F+0.2S)$ and $(0.18F+0.28S)$, where S is the axial distance between the two members.

3. An objective according to claim 2 in which the rear component of the positive member has a power between $-0.8/F$ and $+0.2/F$ and is meniscus in shape and its convex surface has a radius of curvature between $0.7F$ and $2F$ when convex to the front and between $0.4F$ and $0.7F$ when convex to the rear.

4. An objective according to claim 3 in which the positive member consists of a front positive component, a middle biconvex component, and a rear component, the rear component being compound.

5. An objective according to claim 1 in which the rear component of the positive member has a power between $-0.8/F$ and $+0.2/F$ and is meniscus in shape and its convex surface has a radius of curvature between $0.7F$ and $2F$ when convex to the front and between $0.4F$ and $0.7F$ when convex to the rear.

6. A photographic objective comprising a front negative member and a rear positive member in optical alignment and spaced apart by a distance which is more than $0.5F$ and less than $5F$ where F is the focal length of the objective, the powers of the two members being such that the back focal length of the objective is between $0.7F$ and $2F$, in which the negative member is meniscus in outward form and convex to the front and comprises a front positive element and a negative element closely adjacent thereto, the refractive index of the front element being greater than that of the negative element by between 0.08 and 0.5 and the internal pair of surfaces separating these two elements differing in curvature by less than $\pm 0.5/F$ and having an average curvature between $-1/F$ and $+0.2/F$, and in which the positive member consists of a rear component and at least one positive component in front thereof, at least one of which components is compound and includes a pair of internal surfaces differing in curvature by less than $\pm 0.5/F$ and having negative power for correcting the spherical aberration of the objective, the total of the airspaces within the positive member being between zero and $0.4F$, and which objective is characterized by the rear component of the positive member having a power between $-0.8/F$ and $+0.2/F$ and being meniscus in shape such that the radius of curvature of its convex surface is between $0.7F$ and $2F$ when convex to the front and between $0.4F$ and $0.7F$ when convex to the rear.

7. An objective according to claim 6 in which the average curvature of the said pair of internal surfaces within the positive member is numerically between $0.8/F$ and $2/F$ and the difference between the refractive indices of the elements separated thereby is between 0.12 and 0.30.

8. An objective according to claim 7 in which the axial thickness of the positive member is between $0.25F$ and $1.6F$ and that of the negative member is between $(0.5E+0.1S)$ and $(E+0.2S)$ where E is the diameter of the maximum entrance pupil and S is the axial separation of the two members.

9. An objective according to claim 1 in which the negative member consists of a negative cemented doublet and a simple negative element positioned therebehind and separated therefrom by an airspace having the shape of a positive meniscus lens, the total axial thickness of the negative member is between $(0.5E+0.1S)$ and $(E+0.2S)$, and the radii of curvature of the front and rear surfaces of the negative member are within ±10% of the values $$(0.84S+0.70\ F^2/F_L+0.52F)$$

and $$(0.22S+0.22\ F^2/F_L+0.20F)$$

respectively, where E is the maximum diameter of the entrance pupil, S is the axial separation of the two members, and $F_L$ is the focal length of the rear component of the positive member.

10. An objective according to claim 1 in which the negative member consists of three lens elements cemented together, the refractive index of the third element being lower than that of the front element and higher than that of the middle element, the total axial thickness of the negative member is between $(0.5E+0.1S)$ and $(E+0.2S)$ and the radii of curvature of the front and rear surfaces of the negative member are within ±10% of the values $$(0.84S+0.70\ F^2/F_L+0.52F)$$

and $$(0.22S+0.22\ F^2/F_L+0.20F)$$

respectively, where E is the maximum diameter of the entrance pupil of the objective, S is the axial separation of the two members, and $F_L$ is the focal length of the rear component of the positive member.

11. An objective according to claim 1 in which the negative member consists of two lens elements cemented together, the total axial thickness of the negative member is less than $(E+0.2S)$, the radii of curvature of the front and rear surfaces of the negative member are between 100% and 120% of the values $$(0.84S+0.70\ F^2/F_L+0.52F)$$

and $$(0.22S+0.22\ F^2/F_L+0.20F)$$

respectively, and the rear component of the positive member is convex to the rear, where E is the maximum diameter of the entrance pupil of the objective, S is the axial separation of the two members, and $F_L$ is the focal length of the rear component of the positive member.

KARL TOLLE.

REFERENCES CITED

The following references are of record in the file of this patent:

UNITED STATES PATENTS

| Number | Name | Date |
|---|---|---|
| 1,085,868 | Konig | Feb. 3, 1914 |
| 1,862,950 | Ball | June 14, 1932 |
| 1,955,590 | Lee | Apr. 17, 1934 |
| 1,996,054 | Bowen | Apr. 2, 1935 |
| 2,126,126 | Merte | Aug. 9, 1938 |
| 2,247,068 | Richter | June 24, 1941 |

FOREIGN PATENTS

| Number | Country | Date |
|---|---|---|
| 388,215 | Great Britain | Feb. 23, 1933 |